United States Patent
Mangal et al.

(10) Patent No.: US 7,522,579 B1
(45) Date of Patent: Apr. 21, 2009

(54) CABLE SYSTEM PROVIDING SIP-BASED PROXY SERVICES

(75) Inventors: Manish Mangal, Overland Park, KS (US); Jack E. Brown, Leawood, KS (US)

(73) Assignee: Sprint Communications Company LP, Overland Park, KS (US)

( * ) Notice: Subject to any disclaimer, the term of this patent is extended or adjusted under 35 U.S.C. 154(b) by 1088 days.

(21) Appl. No.: 10/837,795

(22) Filed: May 3, 2004

(51) Int. Cl.
H04L 12/66 (2006.01)
(52) U.S. Cl. .............. 370/352; 370/522; 379/88.17
(58) Field of Classification Search ......... 370/352–356, 370/522; 379/88.17, 207.02
See application file for complete search history.

(56) References Cited

U.S. PATENT DOCUMENTS

2002/0176404 A1* 11/2002 Girard .................. 370/352
2003/0233451 A1 12/2003 Ludvig et al.

OTHER PUBLICATIONS

Cable Television Laboratories, Inc., OpenCable Application Platform Specification, Apr. 19, 2002, pp. 1-22.
Cable Television Laboratories, Inc., DOCSIS Set-top Gateway (DSG) Interface Specification, Feb. 28, 2002, pp. 1-35.
Cable Television Laboratories, Inc., OpenCable™ Host Device Core Functional Requirements, Nov. 21, 2003, pp. 1-77.
Cable Television Laboratories, Inc., PacketCable™ Embedded MTA Primary Line Support Specification, Nov. 28, 2000, pp. 1-32.
Sonus Networks, Sonus' Cable PSTN Interface, A Sonus SMARRT™ Cable Component, 2002.
Innomedia, EMTA 3528 Embedded Multimedia Terminal Adapter, Aug. 2002, pp. 1-3.

* cited by examiner

*Primary Examiner*—Suhan Ni

(57) ABSTRACT

A multimedia terminal adapter for a "data over cable" system includes a host processor. A network interface may be coupled to a cable modem termination system via a cable transceiver. The adapter includes a plurality of device ports. An applications platform is executed on the host processor for providing standardized application program interfaces for allowing compliant application programs to access network services via the network interface to provide multimedia content to at least one of the device ports. A SIP proxy is provided for responding to interconnection of a SIP-compatible device to one of the device ports and for intermediating access to SIP-based services via the network interface.

15 Claims, 2 Drawing Sheets

CABLE SYSTEM PROVIDING SIP-BASED PROXY SERVICES

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to providing multimedia services from a data network such as the Internet to users of cable systems, and, more specifically, to increasing the users' access to voice and video multimedia services with improved network performance.

PacketCable standards have been developed to provide a cable system/IP network architecture to deliver point-to-point multimedia services, such as voice over IP (VoIP). The architecture includes a multimedia terminal adapter (MTA) which may be integrated with a cable modem or connected to a separate cable modem. The MTA performs signal manipulations (e.g., encoding/decoding and A/D and D/A conversion) and implements various network protocols.

The various network services that may be provided to the cable customer typically require corresponding applications to be installed in the MTA. A standard software environment known as the OpenCable applications platform (OCAP) has been developed to encourage compatibility and reduce hardware/software costs. OCAP includes a set of application programming interfaces (API's) that provide an operating system (i.e., middleware) for the application programs themselves. The API's comprise Java software packages that provide program access to basic system resources. An OCAP compliant application program can thus run on any OCAP compatible devices to access network services and multimedia content, among other functions.

The types of services contemplated to be implemented using OCAP include various interactive services such as electronic program guides, voice over IP (VoIP), video telephony, video on demand (VOD), and other services. However, the OCAP model does not enable other types of client/server applications.

One known means of establishing point-to-point communication sessions via the Internet is by using the session initiation protocol (SIP). The SIP protocol performs various functions including determining location of a target endpoint, determining media format capabilities of the session endpoints (using the session description protocol, "SDP"), determining availability of a target endpoint, establishing an active session between endpoints, and terminating an active session. MTA's have become available which support the SIP protocol and which allow access to telephony services by acting as a SIP client. However, these methods provide limited access to SIP-based services by requiring that any particular service be preprogrammed in the MTA and they cannot provide adequate control over communication parameters, such as QoS parameters.

SUMMARY OF THE INVENTION

The present invention has the advantage of extending access within a cable modem environment to SIP-based services from SIP-based and non-SIP-based devices in a manner which enables prioritization of selected SIP-based services over other network services.

In one aspect of the invention, apparatus is provided including a host processor. A network interface may be coupled to a cable modem termination system via a cable transceiver. The apparatus includes a plurality of device ports. An applications platform is executed on the host processor for providing standardized application program interfaces for allowing compliant application programs to access network services via the network interface to provide multimedia content to at least one of the device ports. A SIP proxy is provided for responding to interconnection of a SIP-compatible device to one of the device ports and for intermediating access to SIP-based services via the network interface.

DETAILED DESCRIPTION OF PREFERRED EMBODIMENTS

The OpenCable applications platform set of API's that is being developed by the cable industry standardizes a common operating system for all set top boxes and multimedia terminal adapters so that there is an economy of scale which reduces manufacturing costs and eases deployment of various cabled delivered services. The architecture to date has not allowed or accommodated delivery of SIP-based services to end-users connected to the set top box or MTA. The present invention provides a SIP proxy capability within the set top box or MTA along with the OCAP platform. The set top boxes or MTA's intelligently select one of the functionalities in response to services requests presented to the set top box or MTA.

Figure 1:
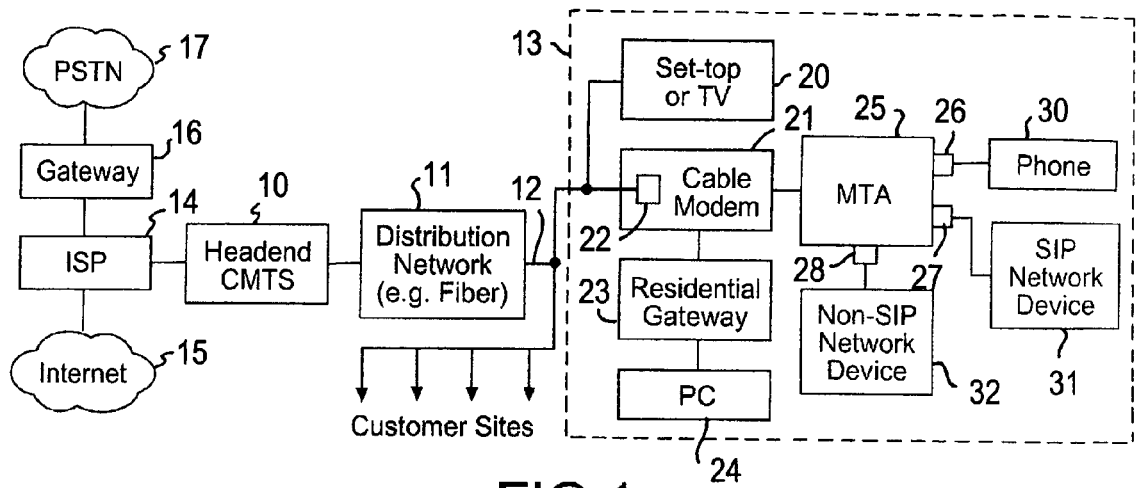
FIG. 1 is a block diagram of a cable/IP network according to the present invention.

An overall architecture of the present invention is shown in FIG. 1. A headend cable modem termination system (CMTS) 10 is connected to a cable distribution network 11 which may comprise a combination of optical fiber and coaxial cable to distribute cable system signals over distribution lines 12 to customer sites including a site 13. CMTS 10 may be connected a conventional cable television signal source (not shown) and to an Internet service provider network 14 providing an interconnection with Internet 15. In order to provide telephony services to remote sites, ISP 14 is also coupled with a gateway 16 to the public switched telephone network (PSTN) 17.

The distribution line 12 into customer site 13 is coupled to a set top box 20 or alternatively directly to a television having a cable tuner. To provide data-over-cable services, a cable modem 21 has a transceiver 22 connected to the distribution line. A conventional residential gateway 23 may be coupled to cable modem 21 to provide network access for a personal computer 24.

In order to provide network access for a variety of services to a variety of different end user devices (e.g., non-general purpose computing devices), a multimedia terminal adapter (MTA) 25 is coupled to cable modem 21. MTA 25 has device ports 26, 27 and 28 coupled respectively to a dedicated phone instrument 30, a SIP network device 31, and a non-SIP network device 32.

MTA 25 provides an integrated environment for a diverse range of network services including voice services to phone 30. Phone 30 may comprise an analog telephone instrument for interfacing with the SIP proxy in MTA 25. SIP network device 31 may comprise a SIP-based phone for likewise accessing voice services. Alternatively, SIP network device 31 may also access video data and other media types as known in the art. SIP-based services may include voice over IP (VoIP), video conferencing, voice conferencing, messaging (e.g., instant messaging, and point-to-point), and multimedia delivery (e.g., prerecorded movies, videos, and music).

Non-SIP network device 32 utilizes OCAP API's within MTA 25 to access other multimedia and network services.

Figure 2:
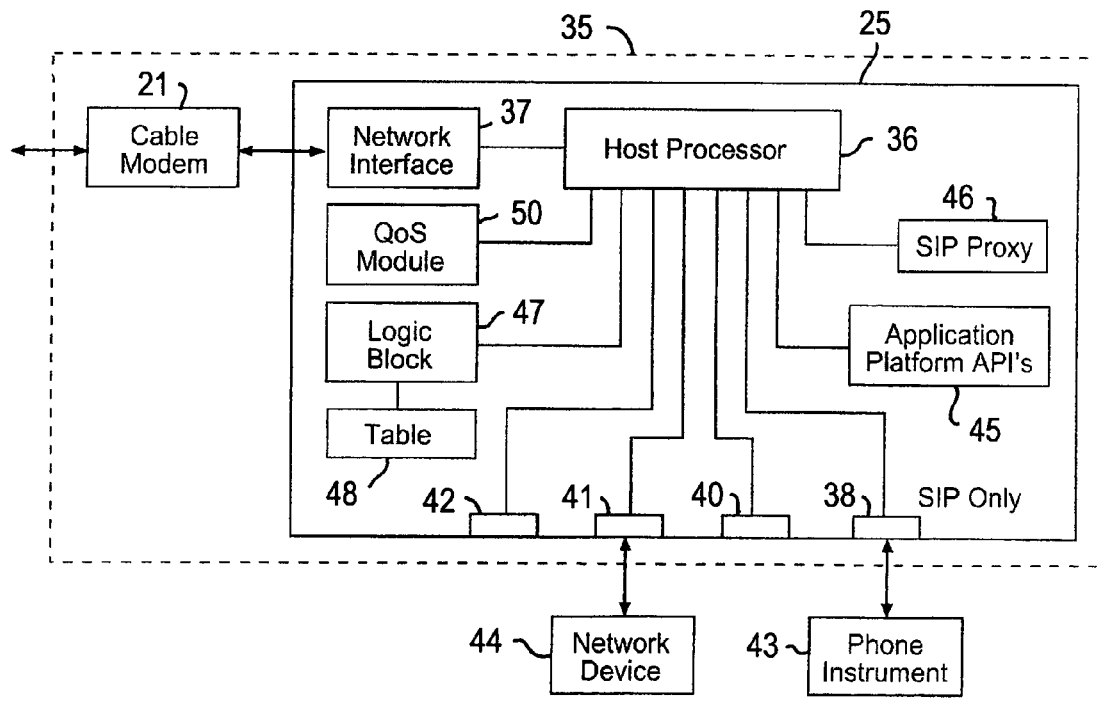
FIG. 2 is a block diagram showing the multimedia terminal adapter of FIG. 1 in greater detail.

MTA 25 is shown in greater detail in FIG. 2. MTA 25 may be integrated with a cable modem 21 as shown, to form an embedded MTA (eMTA) 35.

MTA 25 includes a host processor 36 which operates in accordance with published standards (including Packet-Cable, OpenCable, and DOCSIS specifications, for example). A network interface 37 couples host processor 36 to cable modem 21. Host processor 36 is coupled to a plurality of device ports 38, 40, 41 and 42. Device port 38 includes an RJ11 connector (i.e., a conventional telephone jack) for connecting to a standard analog phone instrument 43. Thus, port 38 comprises a SIP-only port that receives only SIP-based services. Consequently, any activity from an external device connected to device port 38 can be detected as a request for a SIP-based service.

Device ports 40-42 preferably include an RJ45 Ethernet connector. A network device 44 is coupled by appropriate cabling to device port 41. Network device 44 may be a SIP-capable device or a non-SIP-capable device which generates request messages that are coupled to host processor 36 via port 41, wherein a request message identifies whether the requested service is a SIP-based service.

MTA 25 includes application platform API's 45 coupled to host processor 36 for handling requests for OCAP-based services. A SIP proxy 46 is coupled to host processor 36 for handling requests for SIP-based services. SIP proxy 46 acts as both a server and client to deliver SIP-based services to a SIP client device such as phone instrument 43 or network device 44. Thus, SIP proxy 46 is an intermediary between a remote SIP-based service provider and the SIP client device. SIP proxy 46 further interacts with host processor 36 to provide additional controls over SIP-based network sessions (e.g., QoS parameters). SIP proxy 46 is preferably comprised of a software module implemented within host processor 36 and/or executed on host 36.

A logic block 47 classifies network service requests as being either a SIP-base request or an applications platform request. Block 47 is a software element executed by host processor 36. A table 48 may be coupled to logic block 46 to help identify or classify different service requests.

A quality of service (QoS) module 50 is coupled to host processor 36 for handling QoS management of network sessions. In handling SIP-based service requests, SIP proxy 46 has access to QoS management via QoS module 50 to ensure that high priority (e.g., voice) applications are handled with reduced network latency as compared to other service sessions.

Figure 3:
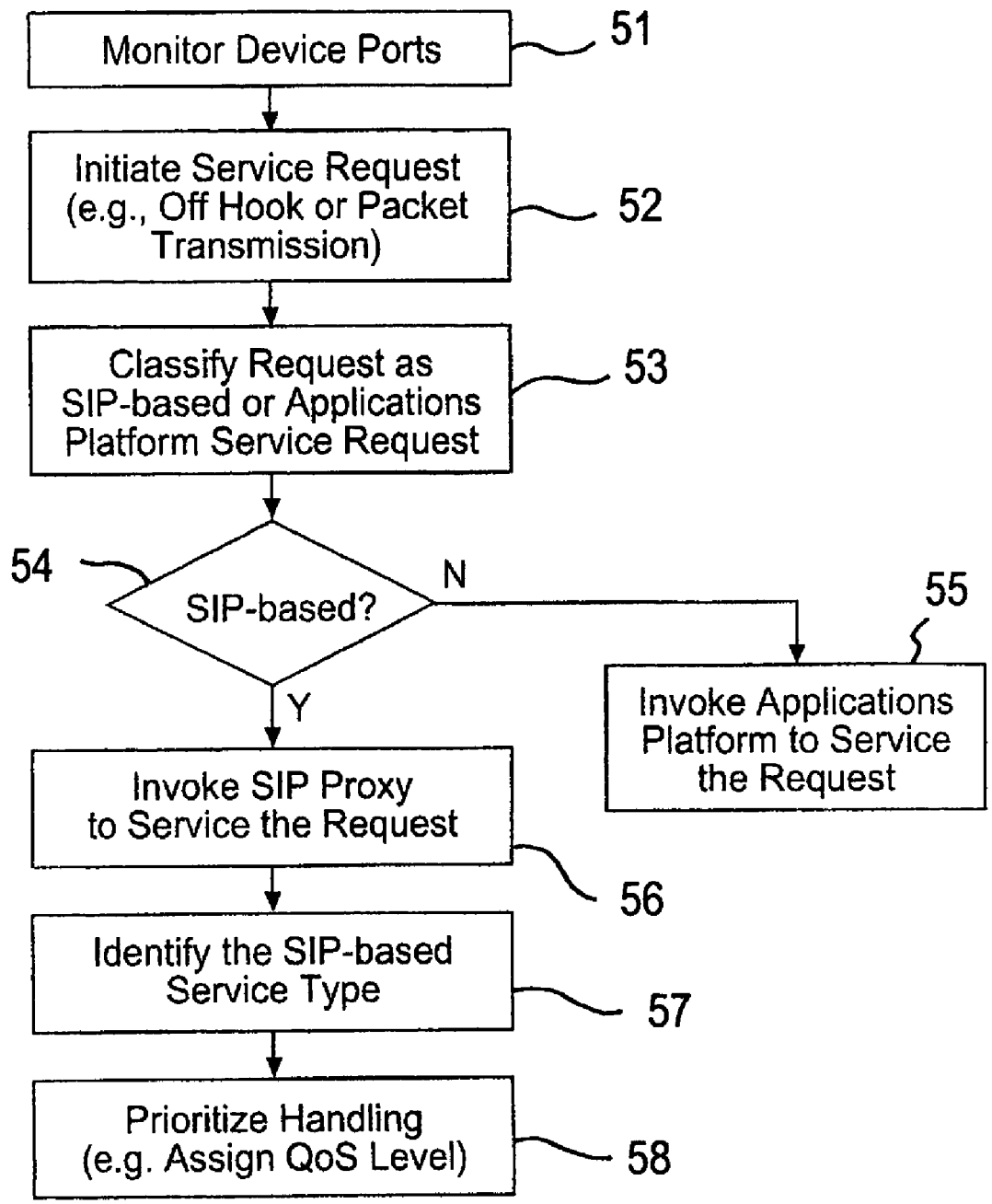
FIG. 3 is a flowchart showing a preferred method of the present invention.

A preferred method of the invention is shown in FIG. 3. In step 51, the host processor monitors the device ports to detect network service requests from user devices connected to the ports. In step 52, a user initiates a service request via the user device. For example, in the case of an analog phone connected to a SIP-only device port, the user taking the phone off hook is detected by the host processor and is interpreted as a SIP-based service request for completing a voice call to a remote telephone. In the case of a digital network user device connected to an Ethernet port, a service request is initiated by transmitting a request message formed as a network packet transmission from the user device to the host processor.

A service request is classified in step 53 as a SIP-based service request or an applications platform service request. The classification is made by the logic block in accordance with predetermined aspects of the request such as an off-hook activity on a SIP-only port or the particular contents of a request message received from a digital network type device. Classification may include comparison of particular information contained in a request message with predetermined data stored in the table coupled to the logic block in order to determine whether the network service being requested is SIP-based or not.

A check is made in step 54 to determine whether the service request is for a SIP-based service. If not, then the applications platform is invoked in step 55 to service the request.

If a SIP-based service request is detected in step 54, then the SIP proxy is invoked in step 56 to service the network service request by establishing a SIP network session. In step 57 of the preferred embodiment, the SIP proxy and/or host processor identify a SIP-based service type wherein the type corresponds to a differentiation in QoS levels needed to successfully implement various SIP-based services. For example, a real time voice call (e.g., using VoIP) is typically given higher network priority than other forms of messaging or file downloading, for example. Handling of the particular SIP-based service request is prioritized in step 58. In particular, transmission of network packets associated with the network service request may be prioritized in response to the SIP-based service type. Prioritization preferably comprises the assignment of a QoS level (e.g., a Class of Service designator) to the transmitted data packets of a particular network session.

The SIP proxy interfaces with the QoS module and host processor in order to provide selectable and/or predetermined QoS service levels as desired. In addition, the SIP proxy provides both a user-agent client and a user-agent server as peers for intermediating between endpoints of a SIP session. The SIP proxy interacts with redirect servers, registrar servers, and location servers via the network interface in a known manner.

What is claimed is:

1. Multimedia terminal adapter apparatus comprising:

a host processor;

a network interface for coupling to a cable modem termination system via a cable transceiver;

a plurality of device ports;

an open cable applications platform (OCAP) executed on said host processor for providing standardized application program interfaces for allowing compliant application programs to access network services via said network interface to provide multimedia content to at least one of said device ports;

a SIP proxy separate from said OCAP for responding to interconnection of a SIP-compatible device to one of said device ports and for intermediating access to SIP-based services via said network interface; and a logic block for detecting network service requests from said device ports and for activating said SIP proxy for handling each of said network service requests that corresponds to one of said SIP-based services.

2. The apparatus of claim 1 wherein said logic block includes a table for mapping respective network service requests to either said SIP proxy or said applications platform.

3. The apparatus of claim 1 wherein said plurality of device ports includes a dedicated SIP device port, and wherein said logic block monitors said SIP device port in order to detect said network service requests corresponding to one of said SIP-based services.

4. The apparatus of claim 3 wherein said SIP device port comprises a voice telephone port.

5. The apparatus of claim 3 wherein said SIP device port comprises an Ethernet port for coupling to a SIP client device.

6. The apparatus of claim 1 wherein said host processor cooperates with said SIP proxy to provide a selected Quality of Service (QoS) to network service requests for accessing said SIP-based services.

7. The apparatus of claim 6 wherein said QoS is selected in response to a type of said SIP-based services being requested.

8. The apparatus of claim 1 wherein said SIP proxy is executed on said host processor.

9. The apparatus of claim 1 wherein said SIP-based services are selected from the group comprising VoIP, voice conferencing, video conferencing, messaging, and multimedia delivery.

10. The apparatus of claim 1 wherein said apparatus is configured as an enhanced multimedia terminal adapter including an integrated cable modem.

11. A method of providing network services to a user connected via a multimedia terminal adapter to a cable modem termination system, said multimedia terminal adapter including an applications platform for providing standardized application program interfaces for allowing compliant application programs to access network services via a network interface and a SIP proxy for intermediating access to SIP-based services via said network interface, said method comprising the steps of:

said user initiating a network service request via a user device;

said multimedia terminal adapter classifying said network service request as a SIP-based service request or an applications platform service request;

if said network service request is classified as said SIP-based service request, then interfacing said user device with said SIP proxy for handling said network service request; and if said network service request is classified as said applications platform service request, then interfacing said user device with said application program interfaces for handling said network service request.

12. The method of claim 11 wherein if said network service request is classified as said SIP-based service request then said method further comprises the steps of:

identifying a SIP-based service type; and prioritizing transmission of network packets associated with said network service request in response to said SIP-based service type.

13. The method of claim 11 wherein said multimedia terminal adapter includes a plurality of device ports, said method further comprising the step of:

monitoring said device ports to detect said network service request.

14. The method of claim 13 wherein one of said device ports comprises a voice telephone port for coupling to an analog telephone instrument, and wherein said monitoring step comprises detecting an off-hook condition of said analog telephone instrument.

15. The method of claim 13 wherein one of said device ports comprises a SIP telephone port for coupling to a SIP telephone, and wherein said monitoring step comprises detecting a transmission of a network packet by said SIP telephone.

* * * * *